UNITED STATES PATENT OFFICE.

CARL HOFFMANN, OF HÖCHST-ON-THE-MAIN, GERMANY, ASSIGNOR TO FARB-WERKE, VORM. MEISTER, LUCIUS & BRÜNING, OF SAME PLACE.

RHODAMIN SULFONIC ACID AND PROCESS OF MAKING SAME.

SPECIFICATION forming part of Letters Patent No. 675,216, dated May 28, 1901.

Application filed October 20, 1900. Serial No. 33,759. (Specimens.)

*To all whom it may concern:*

Be it known that I, CARL HOFFMANN, Ph. D., a citizen of the Empire of Austria-Hungary, residing at Höchst-on-the-Main, Empire of Germany, have invented certain new and useful Improvements in the Manufacture of New Rhodamin Sulfonic Acids, of which the following is a specification.

I have found that by sulfonating asymmetric dialkylrhodamins obtained by condensing equivalent quantities of dialkylamidooxybenzoylbenzoic acid (from one molecular proportion of phthalic acid plus one molecular proportion of dialkyl-m-amidophenol) and m-amidophenols new technically-valuable dyestuffs are produced which dye wool shades similar to those produced by tetraälkylrhodamin, but are distinguished from these rhodamins incapable of being sulfonated by their superior dyeing power, so that they yield shades of any desired depth. The sulfonation of these rhodamins is best carried out by means of fuming sulfuric acid containing twenty to thirty-five per cent. of anhydrid; but the temperature must not be too high.

I have transformed the asymmetric dialkylrhodamin from dialkylamidoöxybenzoylbenzoic acid and m-amidophenol, as well as the methylated asymmetric dialkylrhodamin, from the said acid and ortho-amido-para-cresol (German Patent No. 109,883) into new sulfonic-acid dyestuffs.

The new dyestuffs are substances of metallic luster soluble in water, but with difficulty. They are more easily dissolved, especially when heated, in alcohol and acetone with a red coloration. They are dissolved in concentrated sulfuric acid to a yellow-brown solution with a yellow-green fluorescence. They dye wool in red shades.

I illustrate my process as follows:

Example: Ten kilos of the hydrochlorid of rhodamin from dialkylamidoöxybenzoylbenzoic acid and orth-amido-para-cresol are dissolved at ordinary temperature in sixty kilos of fuming sulfuric acid containing thirty-five per cent. anhydrid. The solution is allowed to stand until a test portion of it dissolves in soda. It is then poured into cold water and the precipitated sulfonic acid is filtered. This sulfonic acid crystallizes from much hot spirit or acetone in aggregates of green-yellow metallic luster. It is soluble in water with difficulty, but easily soluble in dilute alkali. These solutions are of a bluish red, with yellow-green fluorescence. Concentrated sulfuric acid dissolves it easily to a yellow-brown color with yellow-green fluorescence. It dyes wool of a shade similar as tetraethylrhodamin fast to alkali. The baths are well exhausted.

Having now described my invention, what I claim is—

1. The herein-described process for the manufacture of new sulfonic-acid dyestuffs, which consists in sulfonating asymmetric dialkylrhodamins, substantially as set forth.

2. As new products the sulfonic-acid dyestuffs dying wool red, obtained by sulfonating asymmetric dialkylrhodamins, being compounds of metallic luster, soluble in water with difficulty, more easily soluble in alcohol and acetone; the solutions being red with yellow-green fluorescence; concentrated sulfuric acid dissolving the dyestuffs with a yellow-green fluorescence.

3. The herein-described process for the manufacture of a sulfonic-acid dyestuff, which consists in treating asymmetric dialkylrhodamin, obtained by condensing diethylamidooxybenzoylbenzoic acid with ortho-amido-para-cresol, with fuming sulfuric acid, substantially as set forth.

4. As a new product, the sulfonic-acid dyestuff, obtained by sulfonating asymmetric dialkylrhodamin, from diethylamidoöxybenzoylbenzoic acid and ortho-amido-para-cresol, soluble in water with difficulty, readily soluble in alcohol and acetone with a blue-red coloration and yellow-green fluorescence, easily soluble in alkali; the solution in concentrated sulfuric acid being yellow-brown with yellow-green fluorescence; it dyes wool in shades similar as tetraälkylrhodamin.

In testimony that I claim the foregoing as my invention I have signed my name in presence of two subscribing witnesses.

CARL HOFFMANN.

Witnesses:
HEINRICH HAHN,
ALFRED BRISBOIS.